(12) United States Patent
Franz et al.

(10) Patent No.: US 12,055,052 B2
(45) Date of Patent: Aug. 6, 2024

(54) FAN MODULE EQUIPPED WITH AN OIL-TRANSFER DEVICE

(71) Applicant: SAFRAN AIRCRAFT ENGINES, Paris (FR)

(72) Inventors: Caroline Marie Franz, Moissy-Cramayel (FR); Gilles Alain Marie Charier, Moissy-Cramayel (FR); Herve Christian Denis Maine, Moissy-Cramayel (FR); Serge Rene Morreale, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/550,228

(22) PCT Filed: Mar. 8, 2022

(86) PCT No.: PCT/FR2022/050415
§ 371 (c)(1),
(2) Date: Sep. 12, 2023

(87) PCT Pub. No.: WO2022/195195
PCT Pub. Date: Sep. 22, 2022

(65) Prior Publication Data
US 2024/0183284 A1 Jun. 6, 2024

(30) Foreign Application Priority Data
Mar. 16, 2021 (FR) ........................................ 2102623

(51) Int. Cl.
*F01D 17/16* (2006.01)
*F02C 7/06* (2006.01)

(52) U.S. Cl.
CPC .............. *F01D 17/162* (2013.01); *F02C 7/06* (2013.01); *F05D 2220/36* (2013.01); *F05D 2260/40311* (2013.01)

(58) Field of Classification Search
CPC ...... F01D 17/162; F02C 7/06; F05D 2220/36; F05D 2260/40311
See application file for complete search history.

(56) References Cited

U.S. PATENT DOCUMENTS 5,107,676 A * 4/1992 Hadaway ............ F16H 57/0482
60/39.08
7,766,610 B2 * 8/2010 Busekros ................ F01D 25/12
415/108

(Continued)

FOREIGN PATENT DOCUMENTS

EP 3138771 A1 3/2017
EP 3179044 A1 6/2017

(Continued)

OTHER PUBLICATIONS

International Search Report received for PCT Patent Application No. PCT/FR2022/050415, mailed on Apr. 28, 2022, 6 pages (2 pages of English Translation and 4 pages of Original Document).

*Primary Examiner* — Jesse S Bogue
(74) *Attorney, Agent, or Firm* — WOMBLE BOND DICKINSON (US) LLP

(57) ABSTRACT

Fan module for an aircraft turbine engine, the module including a fan having variable-pitch blades and an oil-transfer device configured to transfer oil between a stator and a rotor. The device includes a stator ring having internal oil ducts, a shaft engaged in the ring and having internal oil ducts, and a plain bearing and rolling bearings which are mounted between the ring and the shaft, the ring including first fluidic-connection ports which are configured to cooperate by male-female engagement with ends of oil-supply (Continued)

sockets during blind assembly of the device by axial translation downstream of the device as a whole.

17 Claims, 6 Drawing Sheets

(56) References Cited

U.S. PATENT DOCUMENTS

| | | | |
|---|---|---|---|
| 8,083,030 B2 * | 12/2011 | Portlock | F01D 5/022 |
| | | | 475/159 |
| 8,484,942 B1 | 7/2013 | Mccune et al. | |
| 9,546,567 B2 * | 1/2017 | Kasibhotla | F01D 25/30 |
| 10,774,874 B2 * | 9/2020 | Binion | F01D 25/166 |
| 11,131,244 B2 * | 9/2021 | Kang | F01D 25/04 |
| 2004/0037483 A1 | 2/2004 | Beauvais et al. | |
| 2017/0066523 A1 | 3/2017 | Miszkiewicz | |

FOREIGN PATENT DOCUMENTS

| | | |
|---|---|---|
| GB | 0824332 A | 11/1959 |
| WO | 2013/011225 A2 | 1/2013 |

* cited by examiner

[Fig.1]
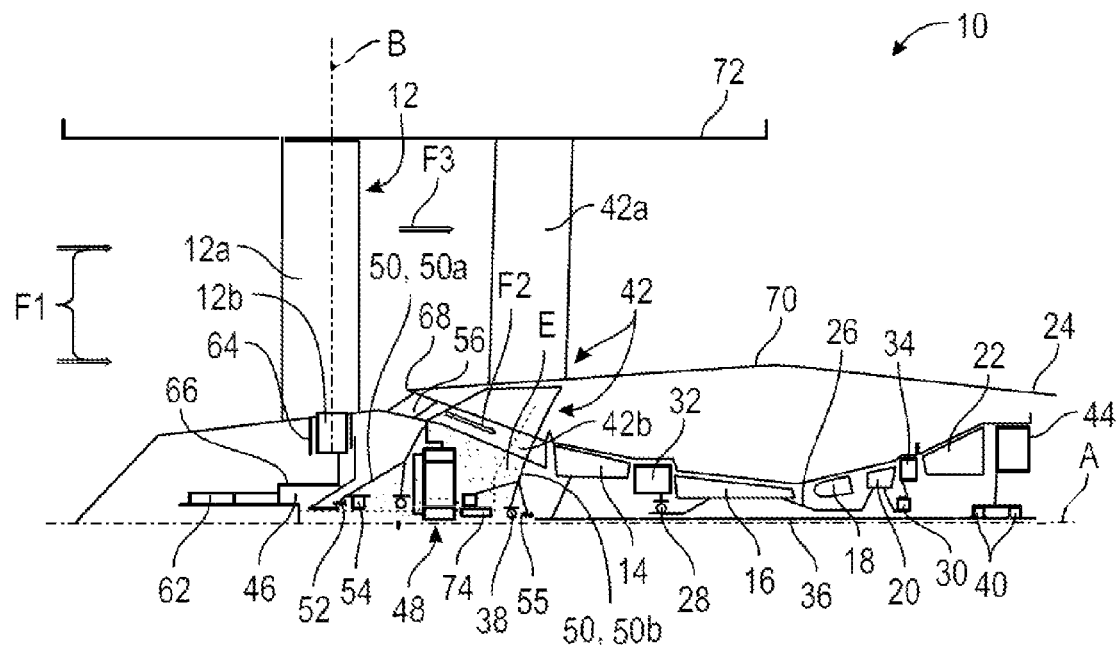

[Fig.2]
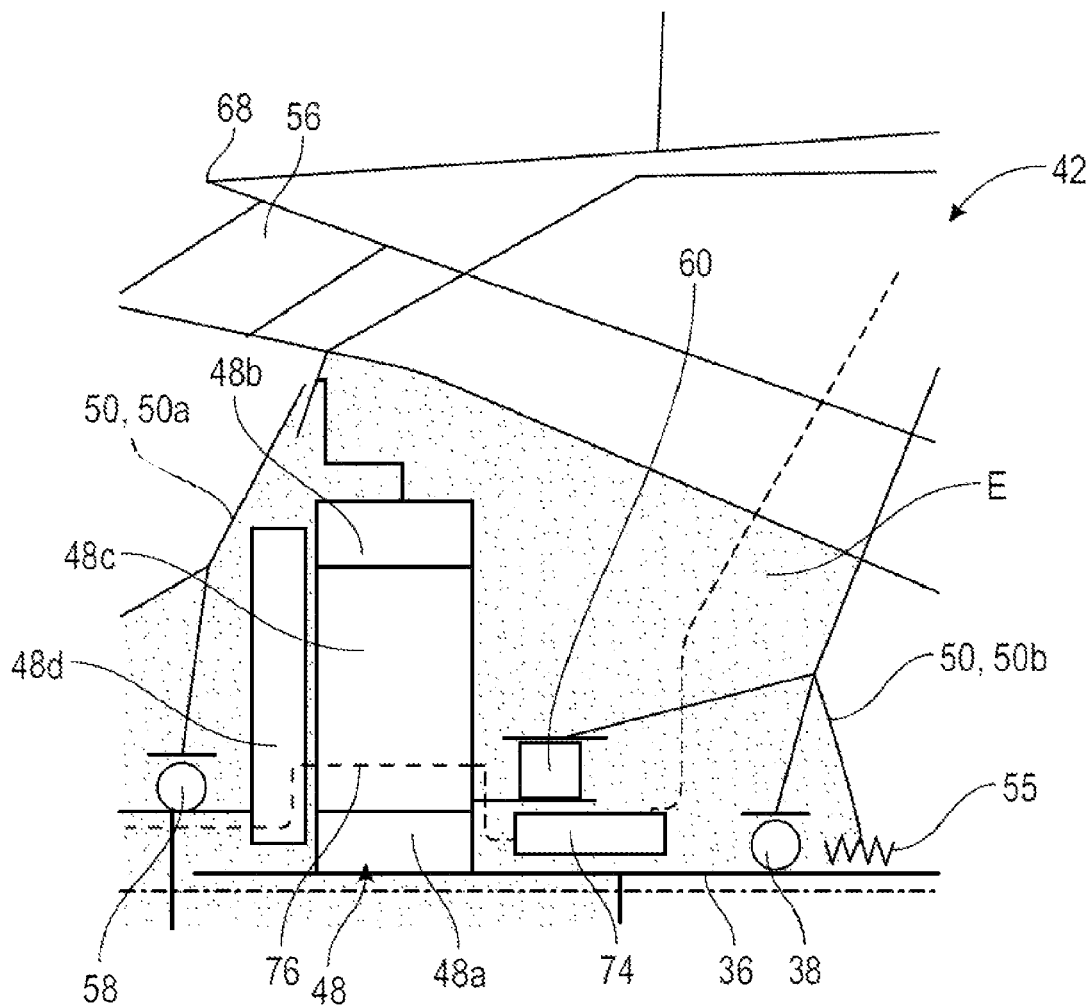

[Fig.3]
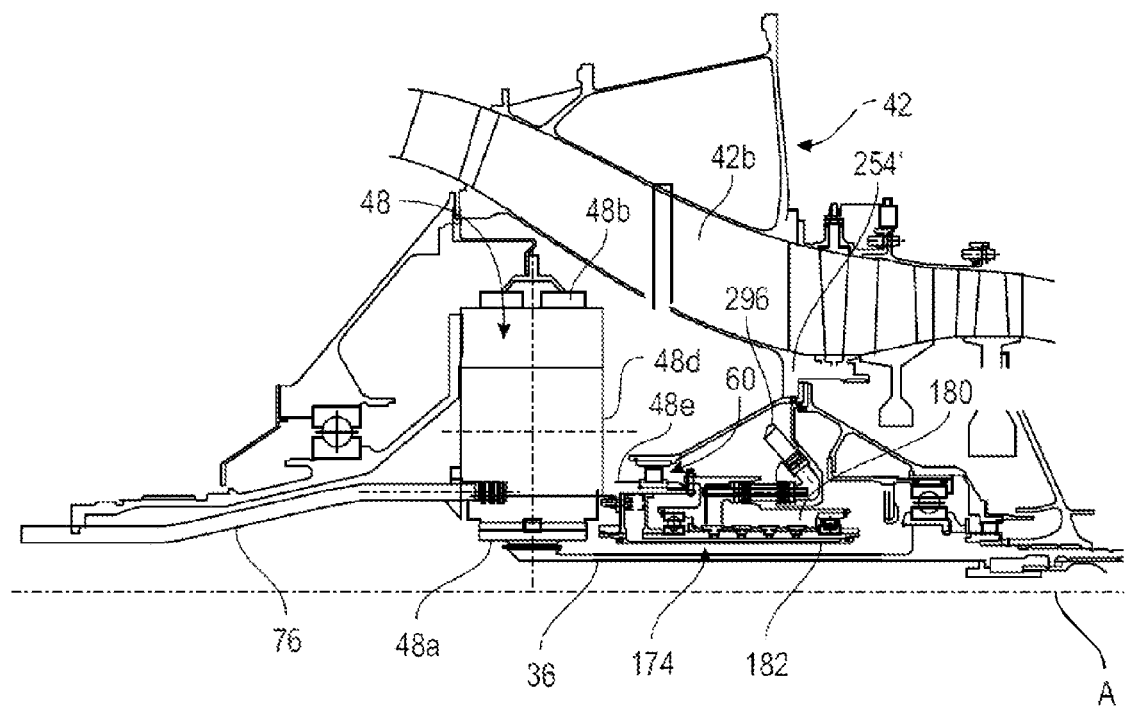

[Fig.4]
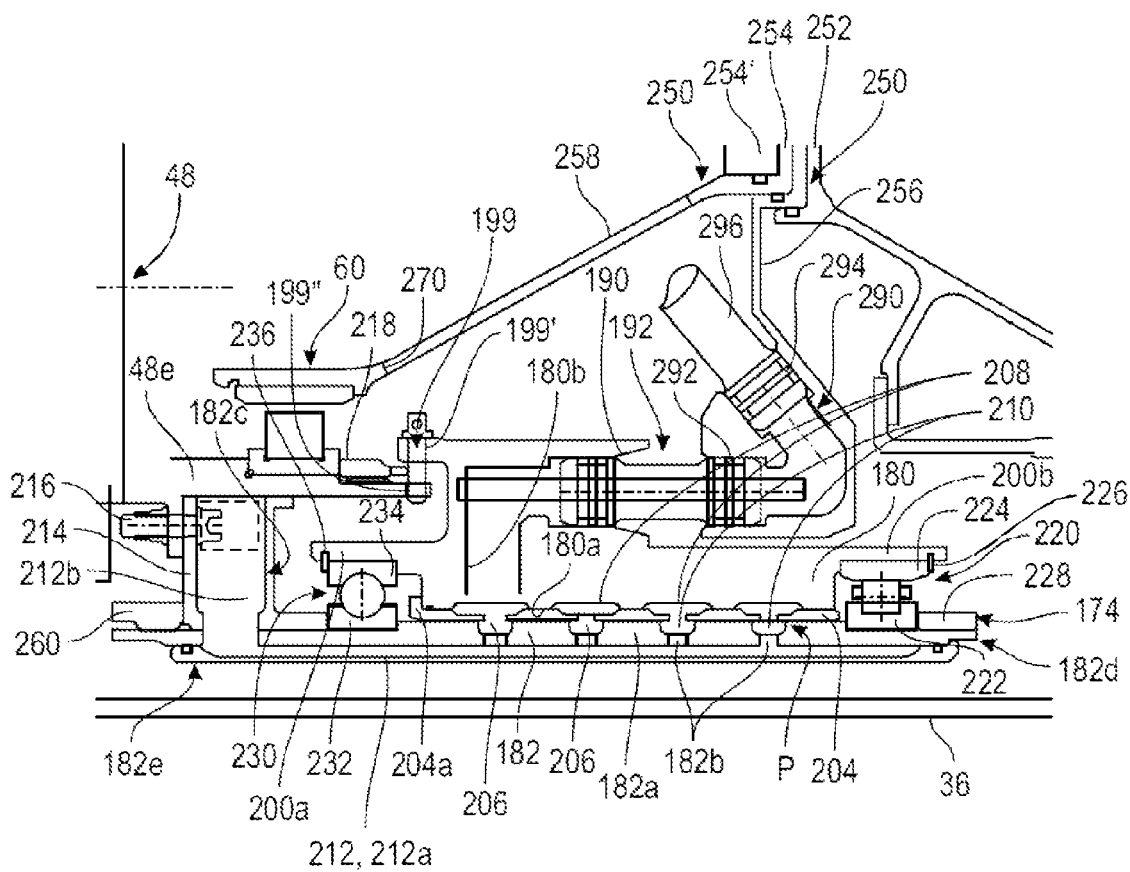

[Fig.5]
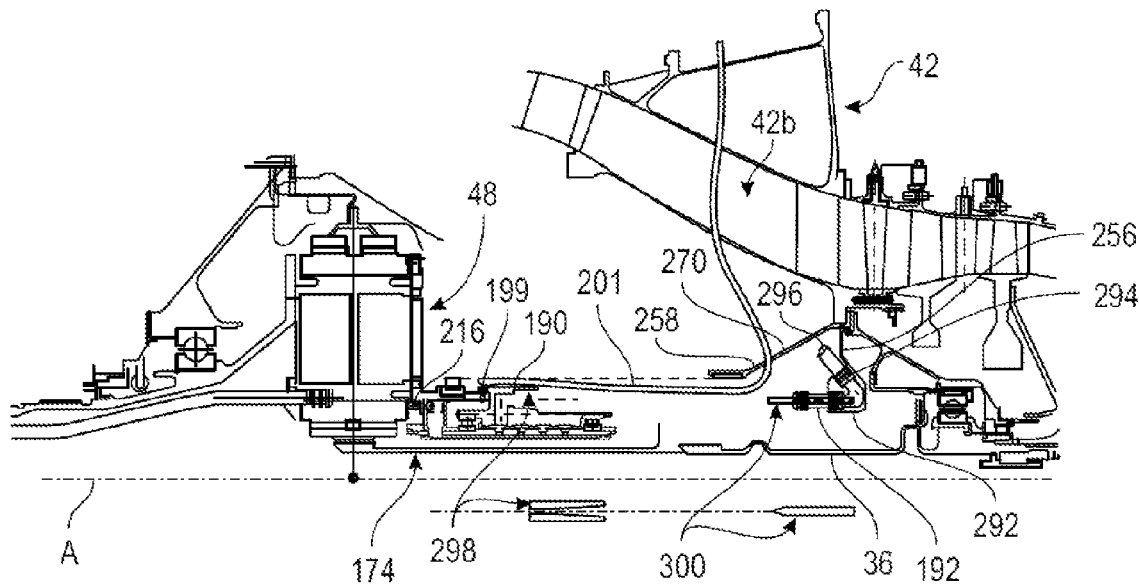
[Fig.6]
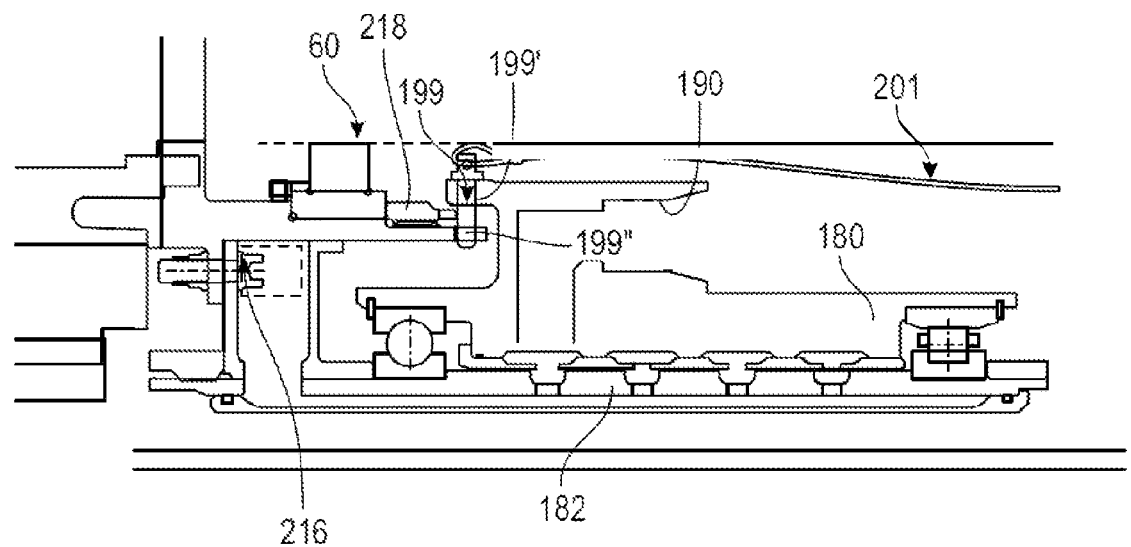

[Fig.7]
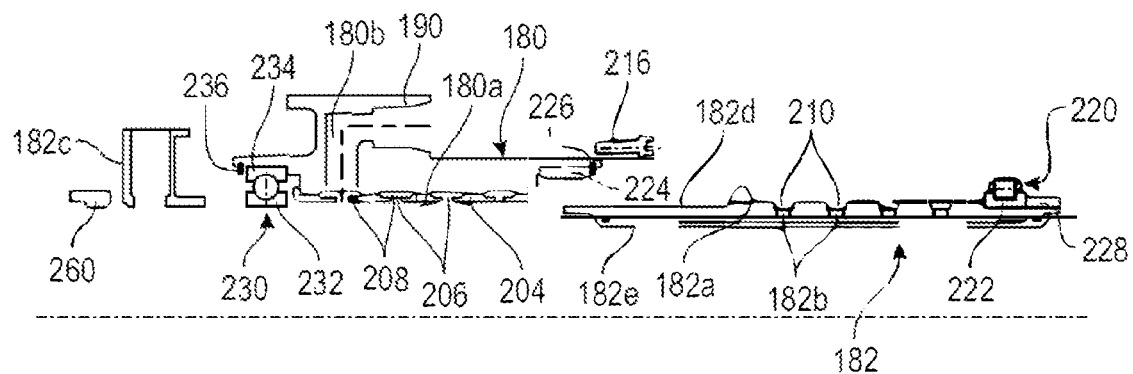
[Fig.8]
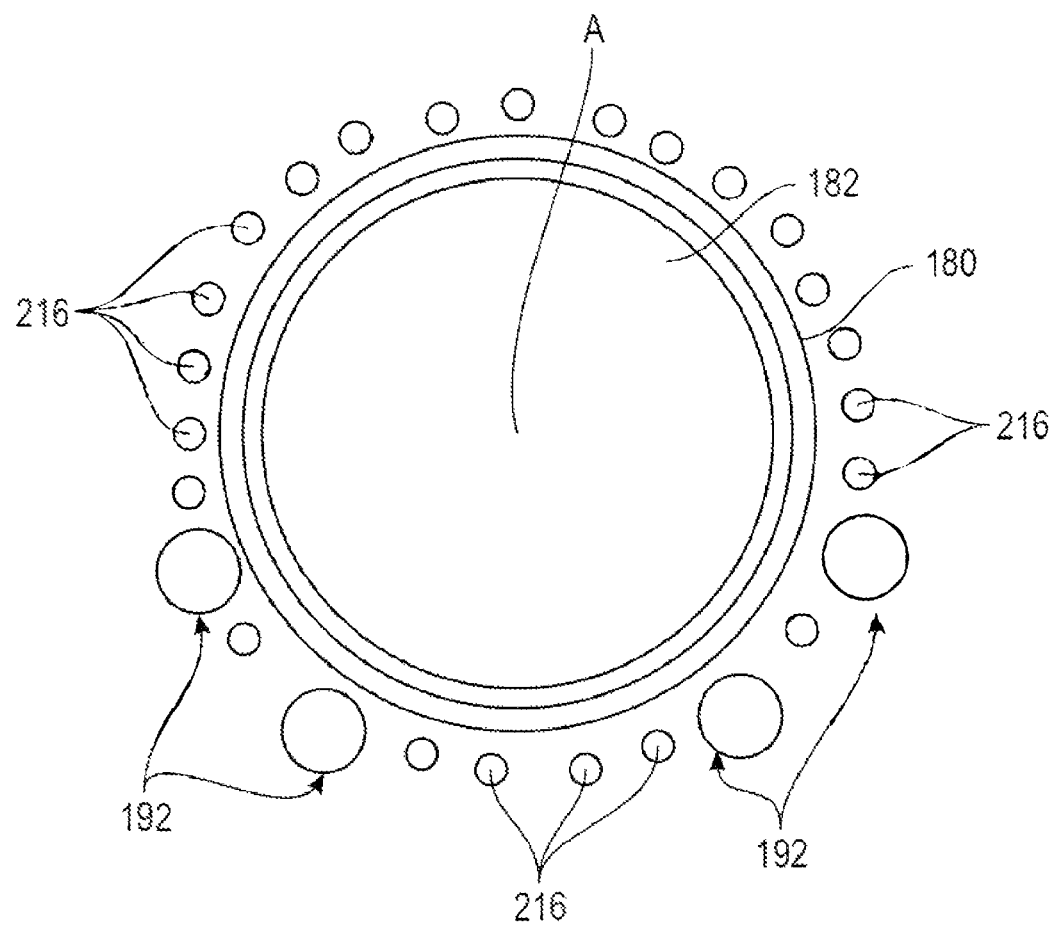

FAN MODULE EQUIPPED WITH AN OIL-TRANSFER DEVICE

TECHNICAL FIELD OF THE INVENTION

The invention relates to a fan module for an aircraft turbine engine, this module comprising an oil transfer device.

TECHNICAL BACKGROUND

The technical background comprises in particular the documents EP-A1-3 179 044, US-A14-2004/037483, EP-A1-3 138 771, WO-A2-2013/011225, GB-A-824 332 and U.S. Pat. No. 8,484,942 B1.

An aircraft turbine engine typically comprises a gas generator comprising, from upstream to downstream in the flowing orientation of the operating gases, at least one compressor, an annular combustion chamber and at least one turbine.

The gases entering the gas generator are compressed in the compressor or the compressors, then mixed with fuel and burnt in the combustion chamber. The combustion gases flow and expand in the turbine or the turbines to drive its rotor or rotors.

In the case of a turbine engine with double body, one low-pressure and one high-pressure, the rotor of the high-pressure turbine is connected by a high-pressure shaft to the rotor of the high-pressure compressor, and the rotor of the low-pressure turbine is connected by a low-pressure shaft to the rotor of the low-pressure compressor.

The turbine engine can be equipped with one or more shrouded or non-shrouded propellers. In the case of a shrouded propeller located upstream of the gas generator, this propeller is referred to as fan and is driven by the low-pressure shaft of the gas generator. The fan generates a flow of gas during operation which is divided into a first flow, referred to as the primary flow, which flows into the gas generator as described above, and a second flow, referred to as the secondary flow, which flows around the gas generator.

The bypass ratio, which is the ratio of the secondary flow rate to the primary flow rate, is increasingly important in the modern turbine engine, resulting in an increase in the diameter of the fan and a reduction in the diameter of the gas generator.

To limit the speed of rotation of the fan, particularly in the turbine engines with a high bypass ratio, it is known to drive this fan by means of a gearbox, generally of the epicyclic or planetary gear train type. The low-pressure shaft then drives the fan by means of the gearbox.

A fan, or a propeller in general, may comprise variable pitch blades, i.e. each of the blades has an orientation about a radial axis that can be precisely adjusted. The blades are carried by a polygonal annulus-shaped hub and are displaced in rotation about these axes by means of a common hydraulic actuator mounted inside the hub. This actuator is supplied with oil and can be located in a rotating reference frame when it is secured in rotation to the hub and to the fan.

The turbine engine comprises a lubrication system comprising an oil reservoir and a pump, which is generally located in a stationary reference frame. It is therefore understood that the actuator must be supplied with oil from the lubrication system via an oil transfer device from a stationary reference frame to a rotating reference frame. A device of this type is commonly referred to as an OTB, an acronym for Oil Transfer Bearing. This type of device can be mounted in a turbine engine with a fan of the type mentioned above to supply the actuator with oil and also to supply the gearbox with lubricating oil. This type of device can also be mounted in another type of turbine engine, such as a turbine engine equipped with a non-shrouded propeller with variable pitch blades, of the turboprop type.

In the present technique, an oil transfer device comprises a stator annulus which comprises an internal cylindrical surface and internal oil pipes which each open onto this internal cylindrical surface. These pipes are connected by conduits to the above-mentioned lubrication system.

The device also comprises a shaft engaged in the annulus and movable in rotation about an axis inside this annulus. The shaft comprises an external cylindrical surface extending inside the internal cylindrical surface of the annulus, and internal oil pipes which each open onto this external cylindrical surface. These pipes are connected to the actuator by conduits to supply it with oil.

In the current technique, the external cylindrical surface of the shaft comprises annular grooves for housing annular sealing segments. These segments are able to displace in the grooves and are configured to rest radially on the internal surface of the annulus to limit and control oil leaks. The outlets of the above-mentioned pipes are located between two adjacent segments, thus ensuring that as much oil as possible from each pipe in the annulus is supplied to a corresponding pipe on the shaft. The number of segments is equal to twice the number of pipes. The document GB-A-824,332 describes an oil transfer device of this type.

However, this technology is unsatisfactory for a number of reasons. The manufacturing and assembly tolerances of the parts make it difficult to control these leaks precisely. The device comprises many parts, which makes the assembly more complex. The manufacture and the assembly of such a device is therefore relatively long and costly. In addition, the greater the number of pipes in the device and the greater the number of sealing segments, the greater the axial dimension and therefore the axial overall dimension of the device for mounting these different segments. An oil transfer device can be complex to integrate into a turbine engine because of its overall dimension. Finally, the service life of such a device is generally limited due to potential misalignments between the shaft and the annulus during operation and wear on the sealing segments, which can be accentuated by these misalignments as well as by the speed of rotation of the shaft. The larger the diameter of the device, the greater the peripheral speed of the shaft and the greater the wear on the segments.

Another disadvantage of the devices of the current technology is that their installation and mounting in a turbine engine is time-consuming and complex. The device can be mounted upstream or downstream of the gearbox. However, the preferred location for the device is downstream of the gearbox for a number of reasons.

An implantation of the device upstream of the gearbox requires large-diameter rotary seal, which are a source of leakage and thermal rejection. In addition, the fan is generally positioned as close as possible to the inlet casing of the turbine engine, to avoid the fan overhang as much as possible. Finally, the length of the turbine engine must be as short as possible to minimise the drag of its nacelle. It is therefore preferable to carry out an integration of the device downstream of the rectifier.

In this case, oil would be supplied to the pipes of the annulus via conduits which would pass through the inlet casing and be connected to these pipes in a radial direction. The access to the device from upstream would not be possible during a maintenance operation. The attachment of the annulus of the device to a stator of the turbine engine, as well as dismounting the annulus from this stator, should be done from downstream of the turbine engine and the lubrication enclosure in which the gearbox is located. This would mean having to dismount the low-pressure compressor of the turbine engine and the equipment mounted in this area, which would be time-consuming and tedious.

The invention thus proposes an improved oil transfer device which solves all or some of the problems of the prior technique.

SUMMARY OF THE INVENTION

The invention relates to a fan module for an aircraft turbine engine, this module comprising a fan which comprises a fan shaft and variable pitch fan vanes, and an oil transfer device which is configured to ensure a transfer of oil between a stator and an actuator which is secured in rotation to the fan shaft and which is configured to control the pitch of the fan vanes, this device comprising:
- a stator annulus comprising an internal cylindrical surface and internal oil pipes each opening onto said internal cylindrical surface, and
- a shaft engaged in said annulus and comprising an external cylindrical surface extending inside said internal cylindrical surface, the shaft comprising internal oil pipes which each open onto said external cylindrical surface, the shaft further comprising an attachment member configured to be attached to a rotor of the turbine engine for driving it in rotation about an axis, characterised in that it further comprises:
- a plain bearing located between said internal and external cylindrical surfaces, and
- rolling bearings mounted between the annulus and the shaft, on either side of the plain bearing, and in that the annulus is mounted with a degree of freedom in the axial direction on the shaft and is immobilised in the circumferential direction around the shaft by means of first elements carried by the annulus and configured to cooperate by male-female engagement in the axial direction with complementary second elements carried by said stator.

The invention thus proposes an oil transfer device with no sealing members or segments between the cylindrical surfaces facing the annulus of the stator and of the shaft. Instead, a plain bearing is provided between these surfaces. Rolling bearings are mounted on either side of this plain bearing so as to guarantee the radial thickness of the plain bearing, whatever the speed of the turbine engine and the peripheral speed of the shaft of the transfer device. The rolling bearings are automatically lubricated by the oil that leaks from the plain bearing during operation. The rolling bearings also ensure the limitation of the oil leakage outside the plain bearing and the device. The rolling bearings also allow to eliminate the risk of misalignment between the annulus and the shaft, and therefore the risk of contact between them and wear. The sealing segments are therefore no longer wear parts of the device, which therefore has an optimised service life compared to the prior technology.

According to the invention, the device takes the form of a "cartridge" when mounted. In the present application, the term "cartridge" refers to the assembly formed by the shaft and the annulus of a device, which are pre-mounted one inside the other before mounting this assembly in a turbine engine.

The device is therefore intended to be attached to a rotor of the turbine engine before this rotor and the device are mounted to the rest of the turbine engine. This assembly is carried out by axial translation, from upstream to downstream, and is made possible by the "floating" assembly of the annulus on the shaft, i.e. by the freedom of axial displacement of the annulus on the shaft. During the mounting, the first elements of the annulus cooperate by male-female engagement with the second elements of the stator, which allows to create a flexible blind connection that maintains this capacity for axial displacement but blocks the annulus in the circumferential direction with respect to the shaft. This translation and this cooperation can therefore be sufficient to secure the annulus in rotation to the stator of the turbine engine. The annulus is thus immobile in rotation about the axis of the turbine engine, but can undergo relative micro-displacements in the axial direction with respect to the shaft of the device, as the annulus is not immobilised in the axial direction with respect to the stator.

The annulus is therefore connected to the stator with a degree of "flexibility" due to its non-rigid connection to the stator. This flexibility is useful in limiting the stresses in the device and the risks of misalignment between the shaft and the annulus of the device, thus ensuring a plain bearing of constant radial thickness inside the device.

The module according to the invention may comprise one or more of the following characteristics, taken alone or in combination with each other:
- the annulus comprises first fluidic connection ports opening in an axial direction, these first ports being connected to the internal pipes of the annulus and being configured to cooperate by said male-female engagement with ends of oil supply conduits or sockets; these first ports can thus be assimilated to said first elements or to a portion of these first elements,
- the number of first ports is equal to the number of pipes in the annulus, the first ports being connected to different pipes in the annulus;
- the first ports are located substantially in the same plane perpendicular to said axis;
- the annulus comprises an orifice for mounting a temporary pin for immobilising the annulus from rotating on the shaft, this pin being configured so as to be engaged in a recess of the aforementioned rotor of the turbine engine when the device is mounted and then to be removed after this mounting;
- the orifice has a substantially radial orientation and is formed at the external periphery of the annulus;
- one of the rolling bearings is a roller bearing and the other is a ball bearing;
- the annulus comprises a first axially oriented indexing member, such as a groove, and configured to cooperate by said male-female engagement with a second axially oriented indexing member, such as a finger, carried by said stator of the turbine engine during said mounting; this first member or this groove can thus be assimilated to said first elements or to a portion of these first elements;
- the support comprises at least one perforated frusto-conical wall;
- a shrink ring is mounted inside the annulus and defines said plain bearing with said external surface of the shaft;
- the rings of the bearings have identical internal diameters;
- the shrink ring has two cylindrical surfaces extending around each other, including a cylindrical shrink-fit surface on the annulus and a cylindrical centring surface on the shaft, the shrink ring comprises orifices which are located opposite the outlets of the pipes of the annulus, and which cover, for example, annular gorges formed at the level of these outlets and/or the outlets of the pipes of the shaft, the fan is driven in rotation by a gearbox, said device being mounted downstream of the gearbox and being configured to supply oil to the gearbox and to the actuator via conduits passing axially through the gearbox, and in particular a planet carrier of the gearbox;

the shaft of the device is attached to the planet carrier of the gearbox, and the annulus of the device is attached to an intermediate casing by an annular support which at least partly surrounds the device;

a rolling bearing, in particular a roller bearing, is mounted between the planet carrier and said support;

the support comprises an annular wall comprising openings for the passage of conduits for supplying oil to the pipes of the annulus, and preferably also for the temporary passage of a cable connected to a pin for immobilising the annulus in rotation on the shaft;

the support comprises an annular wall comprising second ports configured to cooperate by a further male-female engagement with ends of oil supply conduits, these second ports opening radially outwards, and third ports connected to the second ports and configured to cooperate by said male-female engagement with ends of oil supply sockets, opposite ends of which are engaged in said first ports of the annulus;

the support carries said second member;

the gearbox is of the epicyclic type, i.e. with a planet carrier movable in rotation and therefore with a ring gear that cannot rotate;

the device supplies the gearbox with lubricating oil, and in particular to at least some of its bearings and toothing;

the device is configured to supply the actuator with an oil pressure of between 2 and 200 bar, and preferably between 5 and 130 bar;

the device is configured to supply the gearbox with an oil pressure of between 2 and 50 bar, and preferably between 5 and 20 bar.

The present invention also relates to a method for assembling a module as described above, comprising the steps of:

a) mounting the annulus on the shaft of the device, b) attaching the shaft of the device to the rotor of the turbine engine, c) mounting oil supply conduits and/or sockets on said stator of the turbine engine, and d) displacing in translation the rotor and the device towards the stator, until the first ports of the device cooperate with said conduits or sockets.

The method according to the invention may comprise one or more of the following steps, taken alone or in combination with each other:

the method comprises, after step d), a step e) of removing the pin, this pin being connected to a cable which is pulled from outside the turbine engine;

the method comprises, in step d), engaging said first and second members;

in step d), rollers carried by the planet carrier of the gearbox are engaged in an external ring carried by said support, to form a rolling bearing for guiding the planet carrier.

The invention also relates to an aircraft turbine engine, comprising a module as described above.

BRIEF DESCRIPTION OF THE FIGURES

Further characteristics and advantages will be apparent from the following description of a non-limiting embodiment of the invention with reference to the appended drawings in which:

FIG. 1 is a schematic half-view in axial cross-section of a turbine engine equipped with an oil transfer device, FIG. 2 is a larger scale view of a portion of FIG. 1, FIG. 3 is a schematic half-view in axial cross-section of a turbine engine equipped with an oil transfer device according to the invention, FIG. 4 is a larger-scale view of the device shown in FIG. 3, FIG. 5 is a view similar to that of FIG. 3 and illustrates a step in mounting the device in accordance with a method of the invention, FIG. 6 is a larger-scale view of the device shown in FIG. 5, FIG. 7 is a schematic half-view in axial cross-section of the device in FIG. 3 and illustrates a preliminary step in the method according to the invention, and FIG. 8 is another very schematic axial sectional view of the device shown in FIG. 3, and shows the arrangement around the oil supply sockets device and of the attachment screws for attaching the shaft around the device.

DETAILED DESCRIPTION OF THE INVENTION

FIG. 1 shows a turbine engine 10 which typically comprises a fan 12, a low-pressure (LP) compressor 14, a high-pressure (HP) compressor 16, an annular combustion chamber 18, a high-pressure (HP) turbine 20, a low-pressure (LP) turbine 22 and an exhaust nozzle 24.

The rotors of the high-pressure compressor 16 and of the high-pressure turbine 20 are connected by a high-pressure shaft 26 and together form a high-pressure (HP) body, which is guided in rotation about the longitudinal axis A of the turbine engine by rolling bearings 28, 30. A first bearing 28 is mounted between an upstream end of the shaft 26 and of the HP body and an inter-compressor casing 32 located between the compressors LP 14 and HP 16. A second bearing 30 is mounted between a downstream end of the shaft 26 and of the HP body and an inter-turbine casing 34 located between the LP 22 and HP 20 turbines.

The rotors of the LP compressor 14 and of the LP turbine 22 are connected by a low-pressure shaft 36 and together form a low-pressure (LP) body which is guided in rotation about the longitudinal axis A of the turbine engine by rolling bearings 38, 40. At least one bearing 38 is mounted between an upstream end of the shaft 36 of the LP body and an inlet casing 42 located upstream of the LP compressor 14. Other bearings 40 are mounted between a downstream end of the shaft 36 of the LP body and an exhaust casing 44 located downstream of the LP turbine 22.

The fan 12 is driven by a fan shaft 46 which is driven by the LP shaft 36 by means of a gearbox 48. This gearbox 48 is generally of the planetary or epicyclic type.

The following description relates to a gearbox of the epicyclic type, in which the planet carrier and the sun gear are rotatable, the ring gear of the gearbox being stationary in the reference frame of the engine.

The gearbox 48 is positioned in the upstream portion of the turbine engine. A stationary structure comprising schematically, here, an upstream portion 50a and a downstream portion 50b which makes up the engine casing or stator 50 is arranged so as to form an enclosure E surrounding the gearbox 48. This enclosure E is closed upstream by a sealing 52 at the level of a bearing 54 through which the fan shaft 46 passes, and downstream by a sealing 55 at the level of a bearing 38 through which the LP shaft 36 passes.

The enclosure E is arranged inside the inlet casing 42, which is located between an inlet rectifier blading 56 and the LP compressor 14.

FIG. 2 shows the gearbox 48 on a larger scale.

The gearbox 48 comprises a sun gear 48a centred on the axis A and coupled to the LP shaft 36 by means of splines, for example.

The gearbox 48 comprises a ring gear 48b which is also centred on the axis A and attached to the inlet casing 42.

Finally, the gearbox 48 comprises planet gears 48c arranged around the axis A and meshing with the sun gear 48a and the ring gear 48b. These planet gears 48c are carried by a planet carrier 48d which is movable in rotation about the axis A and is connected to the fan shaft 46 to drive it in rotation. The planet carrier 48d is guided by bearings 58, 60 carried by the inlet casing 42, these bearings 58, 60 being located respectively upstream and downstream of the gearbox 48.

The fan 12 shown in FIG. 1 comprises variable pitch blades 12a and is associated with an actuator 62 which allows to control in a centralised manner the positioning of the blades 12a about their axes B, which are generally radial axes relative to the axis A of the turbine engine.

Each of the blades 12a comprises a foot 12b forming a pivot which is housed in a housing of a hub 64 in the form of a polygonal annulus, and which is connected by a connection system 66 connecting to a piston of the actuator 62.

The actuator 62 extends along the axis A and its piston is translationally movable along this axis, for example from a first position in which the blades 12a are feathered to a second position in which the blades 12a obstruct the passage of air through the fan 12.

The airflow F1 which passes through the fan 12 is divided into two annular and coaxial flows downstream of the fan by an annular separator 68 which extends around the blading 56. A first air flow, referred to as the primary flow F2, flows in a primary duct passes through this blading 56 and flows into the compressors 14 and 16 to be compressed. This compressed air is then mixed with fuel and burnt in the combustion chamber 18. The combustion gases are then expanded in the turbines 20, 22 to drive their rotors and the LP 36 and HP 26 shafts, then flow into the nozzle 24.

A second air flow, referred to as the secondary flow F3, flows in a secondary duct which is defined internally by an annular engine casing 70 which extends longitudinally around the compressors 14, 16, the combustion chamber 18 and the turbines 20, 22, and outwardly by an annular nacelle casing 72 which extends longitudinally around the fan 12 and a portion of the engine. This nacelle casing 72 is connected to the engine by outlet guide vanes 42a of the inlet casing 42. These guide vanes 42a are structural and are configured to straighten the flow of air leaving the fan 12.

The actuator 62 is hydraulic and operates with a fluid, oil, which comes from a lubrication system located generally in the nacelle or between the compressors 14, 16 and the casing 70 (i.e. in the engine) and therefore in a stationary reference frame of the turbine engine. In contrast, the actuator 62 is located in a rotating reference frame.

As can be seen in FIG. 2, the turbine engine 10 comprises a device 74 for transferring oil from the stationary reference frame of the engine to the rotating frame in which the actuator 62 is located.

In the example shown, the device 74 is located downstream of the gearbox 48 and preferably comprises several oil supply ways 76 to supply the actuator 62 and also to lubricate the gearbox 48. The dotted line in FIG. 2 symbolises one of these ways along its entire route, from the stationary reference frame to the actuator 62: through the primary duct to the device 74, through the gearbox 48 (between its planet gears or through the axes of these planet gears), and along the planet carrier and then the fan shaft 46.

FIGS. 3 to 8 illustrate an embodiment of an oil transfer device 174 in accordance with the invention.

The device 174 comprises:
a stator annulus 180 comprising an internal cylindrical surface 180a and internal oil pipes 180b each opening onto said internal cylindrical surface 180a, and
a shaft 182 engaged in the stator annulus 180 and movable in rotation about the axis A inside this annulus 180, the shaft 182 comprising an external cylindrical surface 182a extending inside the surface 180a, and internal oil pipes 182b which each open onto the surface 182a.

The pipes 180b are arranged one behind the other along the axis A. There are four of them in the example shown.

Although the pipes 180b are shown here in a same axial plane, they could be located in different axial planes. This depends in particular on the conduits 192 to which they are connected and the arms 42b through which these conduits pass. In yet another variant, the pipes 180b could comprise radially external ends located in a same axial plane and ends distributed angularly around the axis A and opening onto the surface 180a.

Each of the pipes 180b comprises a radially internal end which forms the aforementioned opening and a radially external end which forms a first port 190 for connection to an oil supply socket 192.

The port 190 forms a female portion and one end of the socket 192 forms a male portion engaged in a sealing manner in the port 190.

The port 190 and the socket 192 have an axial orientation, so the socket 192 and the port 190 are engaged by axial translation.

One of the sockets 192 connected to the annulus 180 is shown in FIG. 4. FIG. 8 shows that the number of sockets 192 is equal to the number of pipes 180b, so there are four of them. These sockets 192 are distributed over a lower half of the annulus 180 and the device 174. The sockets 192 are located, for example, at 4, 5, 7 and 8 o'clock by analogy with the face of a clock.

The sockets 192 have their axial ends opposite the ports 190 axially engaged in second ports of an annular support 250, as will be described in more detail below.

In the example shown, the sockets 192 are of the "dog bone" type, i.e. they are generally shaped like dog bones. They each have an elongated shape with enlarged longitudinal ends, which here carry O-ring seals that cooperate with the ports 190.

The annulus 180 is generally cylindrical in shape and comprises an upstream cylindrical rim 200a and a downstream cylindrical rim 200b. These rims 200a, 200b have identical or similar diameters.

A shrink ring 204 is attached inside the annulus 180 so as to cover its surface 180a. This shrink ring 204 extends over a major portion of the length of the annulus 180 and comprises a radially external annular rim 204a at its upstream end which bears axially against a cylindrical bearing surface of the annulus 180. As its name suggests, the shrink ring 204 is shrink-fitted into the annulus 180. The shrink-fit associated with the support of its rim 204a ensures that the shrink ring 204 is immobilised with respect to the annulus 180.

The shrink ring 204 comprises an annular row of radial orifices 206 in line with each of the pipes 180b. In addition, an annular gorge 208 is formed at the internal periphery of the annulus 180 and in line with each of the pipes 180b, this gorge 208 being closed on the inside by the shrink ring 204. It is therefore understood that each pipe 180b supply a gorge 208 and that each gorge 208 distributes oil to the orifices 206 of the shrink ring 204.

The shrink ring 204 comprises an external cylindrical shrink-fit surface which is in contact with the internal surface 180a of the annulus 180, and an internal cylindrical centring surface intended to be separated by a predetermined radial distance from the external surface 182a of the shaft 182 to define a plain bearing P.

The shaft 182 has no shrink ring. This allows to reduce the number of tolerance stacking interfaces. As a result, the clearances between rotor and stator are greatly reduced by reducing the number of interfaces.

The pipes 182b in the shaft 182 all have a radial orientation and are arranged one behind the other along the axis A. There are four of them in the example shown.

An annular gorge 210 is formed at the external periphery of the shaft 182 and in line with each of the pipes 182b.

Each of the pipes 182b is connected to a conduit 212 which can be integrated into the shaft 182. One of these conduits 212, visible in section in the figures, comprises an annular segment 212a which extends around the axis A and along a major portion of the length of the shaft 182. The downstream end of this segment 212a is connected to the downstream-most pipe 182b of the shaft, and its upstream end is connected to a radial segment 212b which is formed in an upstream annular rib 214 of the shaft.

This rib 214 is used for the attachment of the shaft 182 of the device 174. In the example shown, the shaft 182 of the device 174 is attached to the planet carrier 48d of the gearbox 48. The planet carrier 48d comprises a downstream cylindrical rim 48e, on the external periphery of which the bearing 60 is mounted, and on the internal periphery of which the rib 214 engages. This rib 214 rests axially upstream on a cylindrical bearing surface of the rim 48e and is held in axial abutment against this bearing surface by screws 216 screwed from downstream onto the internal periphery of the rim 48e.

FIG. 8 shows that the screws 216 are distributed around the axis A and between the sockets 192.

The bearing 60 is a rolling bearing and comprises rollers which are arranged between two rings, an internal ring and an external ring respectively, the internal ring being clamped axially against another cylindrical bearing surface on the external periphery of the rim 48e by a nut 218 screwed onto this periphery from downstream.

The annulus 180 comprises an orifice 199' for mounting a temporary pin 199 for immobilising in rotation the annulus 180 on the shaft 182. This pin 199 is configured to be engaged in a recess 199" of the aforementioned rim 48e of the turbine engine when the device 174 is mounted and then to be withdrawn after this mounting. In the example shown, the orifice 199' has a substantially radial orientation and is formed at the external periphery of the annulus 180. The recess 199" is formed by a notch formed on the free downstream edge of the rim 48e.

The pin 199 comprises a cylindrical body oriented radially in the mounting position and connected to a head comprising a through orifice for attaching one end of a cable 201 (see FIG. 6). This cable 201 is used by an operator to pull the pin 199, disengage it from the orifice 199' and from the recess 199' and remove it from the turbine engine. The head is connected to the radially external end of the body when the pin 199 is in the mounted position.

A first rolling bearing 220 is mounted between the rim 200b of the annulus 180 and the downstream end of the shaft 182.

The bearing 220 is a rolling bearing and comprises rollers arranged between two rings, an internal ring 222 and an external ring 224. The external ring 224 is mounted inside the rim 200b and rests axially on a cylindrical bearing surface on the upstream internal periphery of the rim 200b. Downstream, the ring 224 is retained axially by an annular split strand 226 engaged in an annular groove in the internal periphery of the rim 200b.

The internal ring 222 is mounted on the downstream end of the shaft 182 and is axially supported on a cylindrical bearing surface of the shaft, located upstream.

Downstream, the ring 222 is retained axially by a shrink ring 228 attached to the external periphery of the downstream end of the shaft 182.

A second rolling bearing 230 is mounted between the rim 200a of the annulus 180 and of the shaft 182.

The bearing 230 is a rolling bearing and comprises balls arranged between two rings, an internal 232 and an external 234 respectively.

The external ring 234 is mounted inside the rim 200a and rests axially on a cylindrical bearing surface on the downstream internal periphery of the rim 200a. Upstream, the ring 232 is held axially by an annular split strand 236 engaged in an annular groove in the internal periphery of the rim 200a.

The internal ring 232 is mounted on a portion of the shaft 182 located between the rib 214 and the pipes 182b. This ring 232 rests axially on a cylindrical bearing surface of the shaft 182, located downstream. Upstream, the ring 232 is retained axially by an annular part 182c of the shaft which comprises the rib 214 and which is engaged on another part 182d of the shaft comprising the pipes 182b. The part 182c comprising the rib 214 is clamped axially against the internal ring 232 of the bearing 230 by a nut 260 screwed to the upstream end of the shaft 182 and in particular of the part 182d.

In the example shown, in addition to the parts 182c and 182d, the shaft 182 comprises another annular part 182e which extends along the entire length of the part 182d, inside the latter, and which defines the conduit 212 with this part 182d. The part 182e carries a seal at each of its axial ends, which is intended to cooperate with the internal periphery of the part 182d.

FIG. 3 allows to show that the shaft 182 extends around the LP shaft 36, the upstream end of which is coupled to the sun gear 48a of the gearbox 48 by the aforementioned splines.

The plain bearing P is supplied with oil directly via the pipes 180b of the annulus 180. It is understood that the radial thickness of the space between the shrink ring 204 and the surface 182b is calculated so that controlled leakage takes place at the interfaces between the pipes 180b, 182b, so as to supply the plain bearing P. The oil then spreads over the entire axial extent of the plain bearing P and as far as the rolling bearings 220, 230 in order to lubricate them.

By "way" of the device 174 is meant the association of a pipe 180b of the annulus 180 with a pipe 182b of the shaft 182. In the example shown, the device 174 comprises four ways. Preferably, one of the ways is used to supply oil to the gearbox, another of the ways is used to supply oil to the actuator 62, and another of the ways is used to return oil to the actuator 62. Finally, the last ways can be used for the hydraulic protection of the actuator.

The device 174 is configured, for example, to supply the actuator 62 with an oil pressure of between 2 and 200 bar, and preferably between 5 and 130 bar.

The annular support 250 extends at least partly around the annulus 180 and carries the sockets 192 for fluidic connection to the pipes 180b of the annulus 180. The support 250 comprises a number of annular walls and attachment members for attaching to the casing 42, which in the example shown are formed by annular flanges 252, 254.

The support 250 is preferably configured to deform elastically so as to allow the bearing 60 to displace in a radial direction. This support 250 is independent of the annulus 180 in that they are not rigidly attached to each other.

In the example shown, the support 250 comprises frustoconical walls 256, 258, at least one of which may be perforated, i.e. may comprise through apertures, so as to reduce its rigidity in the radial direction. This rigidity can also be reduced by reducing the thickness of this wall.

A first frustoconical wall 256 of the support 250 extends substantially radially and is connected at its external periphery to the attachment flange 252 for attaching to the casing 42. At its internal periphery, this wall 256 comprises integral pipes 290 comprising ports 292, 294 at each of its ends.

The number of pipes 290 is equal to the number of pipes 180b in the annulus 180 and is four in the example shown. Only one of these pipes 290 is visible in FIGS. 3 and 4. Each of the pipes 290 has an angled shape, one radially internal end of which is connected to the port 292 which extends axially upstream opposite one of the aforementioned ports 190, in order to receive by male-female engagement one end of a socket 192 engaged in this port 190. The radially external end of each pipe 290 is connected to the port 294 which extends radially upstream and outwards to receive by male-female engagement the radially internal end of an oil supply conduit 296.

The support 250 comprises a second frustoconical wall 258 which extends radially outwards from upstream to downstream. This second wall 258 comprises at its external periphery the attachment flange 254 for attaching to the casing 42. The flange 254' of the casing 42, which is attached to the flanges 252, 254, extends in a plane perpendicular to the axis A, which passes between the bearings 220, 230.

The internal periphery of the wall 258 is located upstream of the annulus 180 and carries the external ring of the aforementioned bearing 60 in the example shown.

As mentioned above, the support 250 and in particular its wall 258 comprises openings 270 for the passage of the oil supply conduits 296.

Each of the pipes 296 extends radially, firstly through the openings 270, and secondly through tubular arms 42b of the inlet casing 42 which are located in the flowing duct of the primary flow F2. These pipes 296 then pass through the guide vanes 42a, which are located in the flowing duct of the secondary flow F3, to reach the lubrication system located in the nacelle (see FIG. 1). Alternatively, the lubrication system can be mounted in the engine (between the primary duct—compressors 14 and 16) and the casing 70 of the secondary duct, so that these conduits 192 do not pass through the secondary flow F3.

FIG. 5 also shows that the cable 201 follows the same path as the conduits 296 and passes through one of the openings 270 and the arms 42a, 42b. The end of the cable 251 opposite the pin is held by an operator from outside the turbine engine 10.

FIG. 5 also shows that the annulus 180 comprises at least one first axially oriented indexing member 298, such as a groove, and configured to cooperate by engagement with at least one second axially oriented indexing member 300, such as a finger, which is carried here by one of the sockets 192 or by the wall 256 of the support 250 when the device 174 and the turbine engine 10 are assembled.

The annulus 180 is thus held with respect to the support by this finger or the like. The groove receiving this finger is preferably oriented axially and radially to allow an axial and radial displacement of the finger.

FIGS. 5 to 7 show a method for assembling the device 174.

The parts 182c, 182d and 182e of the device 174 are assembled and attached to each other (see FIG. 7). The device 174 then takes the form of a pre-assembled cartridge. The shaft 182 of the device 174 is then attached to the planet carrier 48d of the gearbox 48 by means of screws 216 (FIGS. 5 and 6).

The downstream ends of the sockets 192 are engaged in the ports 292 and the conduits 296 are engaged in the ports 294 (FIG. 5).

The pin 199 attached to the cable 201 is engaged in the orifice 199' and the recess 199", which temporarily allows to immobilise the annulus 180 against rotation on the shaft 182. The cable 201 is passed through one of the openings 270 and then through aligned arms 42a, 42b of the casing 42 (FIGS. 5 and 7).

The device 174 in the form of a cartridge which is secured to the gearbox 48 is brought closer to the rest of the turbine engine by axial translation so that the upstream ends of the sockets 192 engage in the ports 190 of the annulus 180. This assembly is carried out blind and is guided by the cooperation of the indexing members 298, 300. As this translation takes place, the operator pulls on the cable 201 so that it remains relatively taut at all times (FIG. 5).

FIGS. 3 and 5 show that the shaft 182 is inserted between the shaft BP 36, the upstream end of which is coupled to the sun gear 48a of the gearbox, and the annulus 180, and that the external ring carried by the support 250, and in particular the wall 258, covers the rollers of the bearing 60 located with the internal ring of this bearing on the rim 48e of the planet carrier 48d.

The invention claimed is:

1. A fan module for an aircraft turbine engine, this module comprising a fan that comprises a fan shaft and variable pitch fan vanes, and an oil transfer device that is configured to ensure a transfer of oil between a stator and an actuator that is secured in rotation to the fan shaft and that is configured to control the pitch of the fan vanes, this device comprising:

a stator annulus comprising an internal cylindrical surface and internal oil pipes each opening onto said internal cylindrical surface, and a shaft engaged in said annulus and comprising an external cylindrical surface extending inside said internal cylindrical surface, the shaft comprising internal oil pipes that each open out onto said external cylindrical surface, the shaft further comprising an attachment member configured to be attached to a rotor of the turbine engine to drive it in rotation about an axis, characterised in that it further comprises:

a plain bearing located between said internal and external cylindrical surfaces, and rolling bearings mounted between the annulus and the shaft, on either side of the plain bearing, and in that the annulus is mounted with a degree of freedom in the axial direction on the shaft and is immobilised in the circumferential direction about the shaft by means of first elements carried by the annulus and configured to cooperate by male-female engagement in the axial direction with complementary second elements carried by said stator.

2. The module according to claim 1, wherein the annulus comprises first fluidic connection ports opening out in the axial direction, these first ports being connected to the internal pipes of the annulus and being configured to cooperate by said male-female engagement with ends of oil supply conduits or sockets.

3. The module according to claim 2, wherein the number of first ports is equal to the number of pipes in the annulus, the first ports being connected to different pipes in the annulus.

4. The module according to claim 2, wherein the first ports are located substantially in the same plane perpendicular to said axis.

5. The module according to claim 1, wherein the annulus comprises an orifice for mounting a temporary pin for immobilising the annulus against rotation on the shaft, this pin being configured so as to be engaged in a recess of the aforementioned rotor of the turbine engine when the device is mounted and then to be removed after this mounting.

6. The module according to claim 5, wherein the orifice has a substantially radial orientation and is formed at the external periphery of the annulus.

7. The module according to claim 1, wherein one of the rolling bearings is with roller bearing and the other of the rolling bearings is ball bearing.

8. The module according to claim 1, wherein the annulus comprises a first axially oriented indexing member, such as a groove, and configured to cooperate by said male-female engagement with a second axially oriented indexing member, such as a finger, carried by the stator of the turbine engine.

9. The module according to claim 1, wherein the fan is driven in rotation by a gearbox, said device being mounted downstream of the gearbox and being configured to supply oil to the gearbox and to the actuator via conduits passing axially through the gearbox, and in particular a planet carrier of the gearbox.

10. The module according to claim 9, wherein the shaft of the device is attached to the planet carrier of the gearbox, and the annulus of the device is attached to an intermediate casing by an annular support which at least partly surrounds the device.

11. The module according to claim 10, wherein a rolling bearing, in particular a roller bearing, is mounted between the planet carrier and said support.

12. The module according to claim 10, wherein the support comprises an annular wall comprising openings for the passage of conduits for supplying oil to the pipes of the annulus, and preferably also for the temporary passage of a cable connected to a pin for immobilising the annulus in rotation on the shaft.

13. The module according to claim 10, wherein the support comprises an annular wall comprising:

second ports configured to cooperate by further male-female engagement with ends of oil supply conduits, these second ports opening radially outwards, and third ports connected to the second ports and configured to cooperate by said male-female engagement with ends of oil supply sockets, opposite ends of which are engaged in said first ports of the annulus.

14. The module according to claim 10, wherein the annulus comprises a first axially oriented indexing member, such as a groove, and configured to cooperate by said male-female engagement with a second axially oriented indexing member, such as a finger, carried by the stator of the turbine engine module and the support carries said second member.

15. A method for assembling a module according to claim 1, comprising the steps of:

a) mounting the annulus on the shaft of the device, b) attaching the shaft of the device to the rotor of the turbine engine, c) mounting oil supply conduits and/or sockets on said stator of the turbine engine, and d) displacing in translation the rotor and the device towards the stator, until the first ports of the device cooperate with said conduits or sockets.

16. The method according to the preceding claim 15, wherein:

the fan is driven in rotation by a gearbox, said device being mounted downstream of the gearbox and being configured to supply oil to the gearbox and to the actuator via conduits passing axially through the gearbox, and in particular a planet carrier of the gearbox, the shaft of the device is attached to the planet carrier of the gearbox, and the annulus of the device is attached to an intermediate casing by an annular support which at least partly surrounds the device, and the method comprises, after step d), a step e) of removing the pin, this pin being connected to a cable which is pulled from outside the turbine engine.

17. The method according to claim 15, wherein the fan is driven in rotation by a gearbox, said device being mounted downstream of the gearbox and being configured to supply oil to the gearbox and to the actuator via conduits passing axially through the gearbox, and in particular a planet carrier of the gearbox, wherein the shaft of the device is attached to the planet carrier of the gearbox, and the annulus of the device is attached to an intermediate casing by an annular support which at least partly surrounds the device, wherein the annulus comprises a first axially oriented indexing member, such as a groove, and configured to cooperate by said male-female engagement with a second axially oriented indexing member, such as a finger, carried by the stator of the turbine engine module and the support carries said second member of the module, and the method comprises, in step d), the cooperation by engagement of said first and second members.

* * * * *